United States Patent [19]

Janes et al.

[11] Patent Number: 5,804,114

[45] Date of Patent: Sep. 8, 1998

[54] PROCESS OF MAKING A POLYURETHANE ROLLER WITH HIGH SURFACE RESISTANCE

[75] Inventors: Todd Lucas Janes; Johnny Dale Massie, II; Joan Marie Massie; Ronald Lloyd Roe; Donald Wayne Stafford, all of Lexington, Ky.

[73] Assignee: Lexmark International, Inc., Lexington, Ky.

[21] Appl. No.: 870,782

[22] Filed: Jun. 6, 1997

Related U.S. Application Data

[62] Division of Ser. No. 629,855, Apr. 9, 1996, Pat. No. 5,707,743.

[51] Int. Cl.⁶ ............... C04B 40/00; C04B 35/00; B05D 5/12; B05D 5/06
[52] U.S. Cl. ............... 264/82; 264/104; 427/58; 427/74; 427/162; 427/400
[58] Field of Search ............... 264/82, 104; 427/58, 427/74, 105, 162, 400

[56] References Cited

U.S. PATENT DOCUMENTS

| | | | |
|---|---|---|---|
| 4,058,879 | 11/1977 | Lentz et al. | 29/132 |
| 5,248,560 | 9/1993 | Baker et al. | 428/425.8 |
| 5,434,653 | 7/1995 | Takizawa et al. | 355/259 |
| 5,496,496 | 3/1996 | Kajita et al. | 252/182.24 |

FOREIGN PATENT DOCUMENTS

| | | | |
|---|---|---|---|
| 0 566 418 | 10/1993 | European Pat. Off. | H01B 1/12 |
| 01252979 | 9/1989 | Japan | G03G 15/08 |
| 4008716 | 1/1992 | Japan | C08G 18/67 |
| 4296540A | 10/1992 | Japan | B29D 29/06 |
| 5154944 A | 6/1993 | Japan | B29C 45/00 |
| 5248426 A | 9/1993 | Japan | F16C 13/00 |
| 2 033 410 | 5/1980 | United Kingdom | C09D 3/72 |
| 2 300 050 | 10/1996 | United Kingdom | G03G 15/08 |

*Primary Examiner*—Christopher A. Fiorilla
*Attorney, Agent, or Firm*—John A. Brady

[57] ABSTRACT

An electrophotographic developer roller is made by casting urethane prepolymer mixed with a butadiene, a trifunctional curative and ferric chloride powder. After curing, the roller is baked, which oxidizes the outer surface. The oxidized surface layer is electrically resistive, which is desirable in a developer roller. An excellent developer roller is achieved at low production cost.

12 Claims, No Drawings

PROCESS OF MAKING A POLYURETHANE ROLLER WITH HIGH SURFACE RESISTANCE

CONTINUATION APPLICATION

This application is a division of application Ser. No. 08/629,855; filed Apr. 9, 1996, now U.S. Pat. No. 5,707,743.

RELATED APPLICATION

U.S. patent application Ser. No. 08/423,481, Filed Apr. 19, 1995, having some common inventors with this application is to a developer roller having a polycaprolactone ester body and ferric chloride filler, as does the embodiments of this application.

TECHNICAL FIELD

This invention relates to developer rollers used in electrophotography, and, more specifically, to a roller and its process of manufacture having a surface with a high electrical resistivity layer.

BACKGROUND OF THE INVENTION

A functional developer roller for use in contact electrophotographic printing having a high resistance surface layer over a sermi-conductive core gives excellent print performance independent of the speed of movement of the printing members (termed process speed). This invention is an improvement over a common method which involves making a semi-conductive core and subsequently coating that core with a resistive material in a separate process such as spray or dip coating. For certain applications other developer rollers employ the controlled conductivity of a semi-conductive core having no outer layer, of which U.S. Pat. No. 5,248,560 to Baker et al is illustrative.

By using the novel combination of materials described in this specification a high resistance surface layer over a more conductive core can be produced simply by oxidizing the roll surface. This eliminates the need for coating the conductive roll with a resistive layer in a separate process. This process is an improvement over a more common method which involves making a semi-conductive core and then subsequently coating the core with a resistive material in a separate process such as spray or dip coating. Baking is much more cost effective than spray or dip coating and produces a roller with less defects. The baked polydiene-based roll of this invention mimics the electrical performance of the coated roller and gives excellent print performance over a wide range of process speeds.

DISCLOSURE OF THE INVENTION

The roller of this invention is a cast urethane, electrically conductive rubber roller with a surface layer of high electrical resistivity. This roller mimics the electrical properties of a coated roller. The roller is composed of a polydiene, such as polyisoprene and more specifically polybutadiene, either as a polyol or a urethane prepolymer, blended with a second polyurethane prepolymer and a conductive additive such as ferric chloride. The bulk resistivity of the roller is approximately $1 \times 10^8$ (one times ten to the eighth power) ohm-cm at 72° F. and 50% relative humidity. The surface of the cured roller is oxidized to produce a surface layer of material with high electrical resistivity. Oxidation of the roller is achieved by baking the roller in air at fairly high temperature (approximately 100 degrees C.) for several hours. The reaction of the oxygen with the polybutadiene, catalyzed by the ferric chloride, oxidizes the surface of the roller. The oxidized layer is very resistive. The cost of production is low.

BEST MODE FOR CARRYING OUT THE INVENTION

In electrophotography, the developer roller function is to develop a layer of toner on a photoconductor drum charged in an image pattern. Electrical models of this process have been well reported in the literature. Equations for the development curve, which relates the developed mass of toner per unit area to the development potential, have been derived for several developer roll constructions. The development equations for a semi-conductive roller ($1 \times 10^7$–$1 \times 10^9$ ohm-cm resistivity) and a semi-conductive roller with a high resistance coating have been compared. The electrical model developed by H. Tachibana (Conference Record IEEE IAS 1989, p. 2260, "Control of Toner Reproduction Characteristics by Time Constant of Development Roller in Mono-Component Development") can be used to evaluate the print performance of these rolls for different print speeds, roller electrical properties, and other variations.

Results indicate that a two layer, "coated" roll will develop a fixed quantity of toner per volt of development bias that is determined by the dielectric thicknesses of the photoconductor, the toner and the developer roller. This development characteristic is independent of process speed, within limits. In contrast, a solid roll of a single resistivity develops a quantity of toner based on the dielectric constants of the photoconductor and the toner, and the resistance of the roll in the photoconductor nip. This is dependent on process speed. In addition, a two-layer roll has a longer time constant than a solid roll. Longer time constant materials leave a higher effective development surface potential on the developer roll at the entry to the photoconductor nip. This improves the single pel dot print performance of the roll.

Therefore, the print performance of a two layer roller is superior to that of a solid roll across a wide process speed range and is less sensitive to office environments.

The desired electrical properties during normal operation of a two-layer roller are a core resistivity less than $1 \times 10^9$ ohm-cm, preferably less than $3 \times 10^8$ ohm-cm, at 72° F. and 50% relative humidity (RH), a coating resistivity of $5 \times 10^9$–$2 \times 10^{12}$ ohm-cm, preferably $1 \times 10^{11}$ ohm-cm, at 72° F. and 50% RH and a coating thickness of approximately 50–200 microns, preferably approximately 100 microns, at 72° F. and 50% RH. The time constant should be about 5–2,000 milliseconds, preferably about 100 milliseconds, at 72° F. and 50% RH.

A common technique to produce a semi-conductive roll with a resistive layer is to prepare a core using any standard rubber molding technique, such as casting liquid urethanes or rubber transfer molding. The core is then ground to the correct dimensions and either spray or dip coated with a resistive material to the desired thickness. The coating is usually applied in several layers to build up to the desired thickness of 100 microns. Problems with this process include its higher cost due to the multiple coating steps and the defects introduced into the surface layer during the coating process.

Using the unique combination of materials described in this specification, a resistive surface layer can be produced on a cast urethane roll simply by baking in air at elevated temperature. The oxidation of the polybutadiene, in the presence of ferric chloride, produces a high resistive layer at the surface. The thickness and resistivity of this layer can be controlled by varying the polybutadiene level, the ferric chloride level, the baking time, the baking temperature and the oxygen level.

This invention describes the use of a blend of a urethane prepolymer with polybutadiene, either in diol or urethane prepolymer form and ferric chloride as a conductivity modifier. The blend of materials is cured in roll form and then baked at elevated temperatures ($\geq 80°$ C.) for various times to oxidize the surface of the roll. This oxidation produces a layer of high resistivity material on the surface of the roll.

Polycaprolactone urethane prepolymer, such as Vibrathane 6060 (trademark product of Uniroyal Chemical), is the preferred base urethane because of its stable electrical resistivity with temperature and humidity changes. Vibrathane 6060 is a polycaprolactone ester toluene-diisocyanate prepolymer. Ferric chloride is added to the urethane to reduce the electrical resistivity of the roll core to $<1\times10^9$ ohm-cm. The combination of polycaprolactone urethane and ferric chloride produces a roller with a single resistivity from the roll surface to the center or core. In order to produce a roller with a high resistivity surface layer, a polydiene must be included in the formulation.

In an alternative formulation, polybutadiene prepolymers are prepared by the reaction of a polybutadiene diol (PBD) with toluene diisocyanate (TDI). This PBD-TDI prepolymer can be blended with the caprolactone prepolymer in various proportions. A suitable polybutadiene prepolymer is an experimental product of Uniroyal Chemical. The blend of prepolymers is cured with polyol curatives, such as Voranol 234-630, (trademark product of Dow Chemical Co., Inc.), a trifunctional polyether polyol. Typical polycaprolactone/polybutadiene blend ratios range from 95/5 parts by weight per hundred parts of total rubber which includes the polycaprolactone and the polybutadiene to 60/40 parts by weight.

Polybutadiene can be added in either prepolymer or diol form. The polycaprolactone urethane can be cured by using a combination of polybutadiene diol (such as polybd (trademark) R45HT, a product of Elf Atochem) with a trifunctional curative such as the Voranol 234-630. Voranol 234-630 is a polyether polyol with a functionality of 3. In this case, the polybutadiene diol acts as a polymer chain extender for the urethane. Typical weight ratios of the Voranol to the polybutadiene diol range from 1/0 up to 1/7 by weight, preferably 1/3 by weight. The polybd R45FfT polybutadiene has a molecular weight Mn, of 2800 and a microstructure of 20% cis-1,4-polybutadiene, 60% trans-1, 4polybutadiene and 20% 1,2-polybutadiene.

The polybutadiene prepolymer is a very highly resistive material. The addition of high levels of conductive additives in powder form such as copper (II) chloride or ferric chloride does not lower the electrical resistivity of this material. In contrast, addition of 0.1 parts per hundred rubber by weight ferric chloride powder to one hundred parts by weight polycaprolactone urethane reduces the electrical resistivity from the $5\times10^{10}$ ohm-cm range to approximately $1.5\times10^8$ ohm-cm. Ferric chloride is not soluble in the polybutadiene prepolymer.

Ferric chloride is added to the polybutadiene polycaprolactone urethane blend to reduce the blend bulk resistivity to $<1\times10^9$ ohm-cm. Typical concentrations of ferric chloride range from 0.05–0.30 parts by weight per hundred rubber, preferably 0.1–0.25 parts by weight per hundred by weight rubber. Other conductive additives in powder form, such as ferrous chloride, calcium chloride and cobalt hexafluoroacetylacetonate are alternatives to the ferric chloride.

The urethane formulation is then cast into a mold around a central, metal shaft and then cured at approximately 100 degrees C. for 16 hours using a combination of curing in a mold, demolding and postcuring in an oven to produce a rubber roller. The roller is then ground to the correct dimensions. This roller does not have a resistive layer on the surface. The resistive layer is produced by baking the ground roll in air at an elevated temperature for some length of time. This baking procedure oxidizes the polybutadiene. The polybutadiene is highly unsaturated (60% trans 1,4; 20% cis 1,4 structure) which makes it very susceptible to oxidation. The presence of ferric chloride is necessary to catalyze this oxidation process. A highly resistive layer is not formed in the presence of copper chloride since copper chloride does not sufficiently catalyze the oxidation reaction to produce a high resistance surface layer. Alternatives which do catalyze this oxidation process are ferrous chloride, calcium chloride and cobalt hexafluoroacetylacetonate.

The oxidation of polybutadiene in the presence of ferric chloride produces a highly resistive surface layer. The thickness and electrical resistivity of this surface layer can be controlled by varying the concentration of ferric chloride, concentration of polybutadiene, the baking temperature, the level of oxygen and the baking time.

The rollers are tested and characterized by a variety of electrical techniques. A roll is typically cleaned with isopropyl alcohol and painted with conductive carbon paint in a 10 mm strip down the roll. A circuit is made by making electrical contact with the painted surface and the roller shaft. The DC resistivity of the roll at 100V, the AC resistivity of the roll at 1 KHz, and the time constant are measured. The time constant is measured by applying a 100 volt bias to the roll, removing the voltage and measuring the time for voltage on the roll to decay to 1/e (37%) of its original value. This time constant is related to the thickness and resistivity of the surface layer on the roll. The roller is modelled as two parallel RC circuits in series. One RC circuit represents the core and the second represents the coating. Based on this model, the following equations apply:

$$tau = R^*C = rho_c^* Kc^* epsilon_o$$
$$rho_c = tau/(Kc^* epsilon_o)$$
$$T = R^*A/rho_o$$

where
tau=time constant
rho=coating resistivity
C=capacitance
Kc=dielectric constant of coating
$epsilon_o = 8.85\times10^{-12}$ Coulombs$^2$/Newtons×Meters$^2$ (permittivity of free space)
T=thickness of resistive layer
R=roll DC resistance
A=surface area of roll Therefore, the coating thickness and resistivity can be calculated from the time constant and DC resistance measurements. The dielectric constant of the coating is assumed to be 10, a typical value for polyurethane rubber.

Increasing the polybutadiene level increases the resistivity of the coating. Increasing the time and temperature of baking increases both the coating thickness and the coating electrical resistivity. By the correct combination of polybutadiene level and baking conditions, a roller with a resistive surface layer of between $5\times10^9$ and $2\times10^{12}$ ohm-cm and a surface layer thickness of approximately 50–200 microns measured at 72° F. and 50% relative humidity can be produced.

It is not uncommon for an office environment to have a high humidity and for a printer, particularly a developer roller inside a printer, to be exposed to a high operating temperature (>40° C.). Polyurethane can degrade when exposed to a high level of moisture such as 80% relative humidity for a prolonged period of time and high temperature can accelerate the degradation of urethane rubber. Also, an acid source will accelerate the degradation. The addition of ferric chloride, which is a highly acidic material, to polyurethane will accelerate the degradation of the urethane. Degradation is defined as the loss in durometer hardness over time and is characterized herein as a loss in durometer hardness when exposed to a high temperature and high humidity environment such as 60° C. and 80% relative humidity for a specified period of time. The use of a hydrolytic stabilizer is required to maintain the roll physical and electrical properties over a long period of time and at various environmental conditions. The addition of TIPA (trademark of Dow Chemical Co.) (chemically, triisopropanolamine 99) acts to hydrolytically stabilize the described urethane-based developer roll.

Tests show the following:

|  | 12 days exposure at 60° C./80% rh |
| --- | --- |
| Roller based on polycaprolactone-TDI + polybutadiene diol with | |
| −0.20 phr ferric chloride | 40% loss of hardness* |
| −0.20 phr ferric chloride + 0.12 phr TIPA | 4% loss of hardness | phr = parts per hundred by weight
*Durometer hardness is measured according to ASTM D2240-86 using type A hardness (Shore A)

The addition of a low concentration of TIPA shows no influence on the electrical properties of the roll.

The resistive surface layer produced by the oxidation process is permanent. Oxidized rolls have been analyzed for several months without a significant change in electrical properties.

Print test results of the described oxidized polybutadiene-based rolls indicate that they have excellent print performance across a wide speed range. Their performance mimics that of a conductive roll coated in a separate process with a resistive material.

Specific working applications of this invention include:

EXAMPLE 1

| Vibrathane 6060[1] | 100 phr |
| --- | --- |
| | (phr is parts per hundred by weight) |
| Voranol 234-630[2] | 5.5 phr |
| poly bd R-45HT[3] | 16.5 phr |
| Ferric chloride | 0.20 phr |
| Triisopropanolamine 99 | 0.12 phr |
| DC 200 silicone oil, 50 cs[4] | 3.0 phr |
| Reaction stoichiometry of 95% | |
| Baked 10 hours at 100° C. | |

[1]Vibrathane 6060 having an NCO content of 3.44%
[2]Voranol 234-630 having a hydroxyl number of 630.6
[3]poly bd R-45HT having a hydroxyl value of 0.86
[4]DC 200 is a trademark of Dow Corning Corporation

EXAMPLE 2

| Vibrathane 6060 | 90 phr |
| --- | --- |
| | (phr is parts per hundred by weight) |
| Uniroyal Chemical PBD-TDI prepolymer | 10 phr |
| Voranol 234-630 | 6.9 phr |
| Ferric chloride | 0.1 phr |
| DC 200 silicone oil, 50 cs | 3.0 phr |
| Reaction stoichiometry of 95% | |
| Baked 20 hours at 100° C. | |

EXAMPLE 3

| Vibrathane 6060 | 100 phr |
| --- | --- |
| | (phr is parts per hundred by weight) |
| Voranol 234-630 | 6.5 phr |
| poly bd R-45HT | 6.5 phr |
| Ferric Chloride | 0.1 phr |
| Reaction stoichiometry of 95% | |
| Baked 6 hrs at 100° C. | |

Variations will be apparent and can be anticipated. Patent coverage is sought as provided by law, with particular reference to the accompanying claims.

What is claimed is:

1. The process of making a developer roller comprising casting a mixture of polydiene diol or a prepolymer of polydiene diol with toluene diisocyanate, a urethane prepolymer, a polyol with functionality greater than 2, and a powder of a conductive metal salt which catalyzes the oxidation of said polydiene during baking to form a roller having an outer surface,
curing said cast mixture and
then baking said cured mixture to oxidize said outer surface of said roller.

2. The process as in claim 1 in which said polydiene diol or a prepolymer of polydiene diol is polybutadiene diol.

3. The process as in claim 2 in which said urethane prepolymer is polycaprolactone ester toluene-diisocyanate prepolymer.

4. The process as in claim 3 in which said conductive metal salt is ferric chloride used in an amount of about 0.1 to 0.25 parts by weight to about 100 parts by weight of said polycaprolactone ester toluene-diisocyanate prepolymer.

5. The process as in claim 4 in which said mixture contains a minor amount of a triisopropanolamine sufficient to stabilize the urethane of said cured mixture.

6. The process as in claim 3 in which said mixture contains a minor amount of a triisopropanolamine sufficient to stabilize the urethane of said cured mixture.

7. The process as in claim 2 in which said mixture contains a minor amount of a triisopropanolamine sufficient to stabilize the urethane of said cured mixture.

8. The process as in claim 1 in which said urethane prepolymer is polycaprolactone ester toluene-diisocyanate prepolymer.

9. The process as in claim 8 in which said conductive metal salt is ferric chloride used in an amount of about 0.1 to 0.25 parts by weight to about 100 parts by weight of said polycaprolactone ester toluene-diisocyanate prepolymer.

10. The process as in claim 9 in which said mixture contains a minor amount of a triisopropanolamine sufficient to stabilize the urethane of said cured mixture.

11. The process as in claim 8 in which said mixture contains a minor amount of a triisopropanolamine sufficient to stabilize the urethane of said cured mixture.

12. The process as in claim 1 in which said mixture contains a minor amount of a triisopropanolamine sufficient to stabilize the urethane of said cured mixture.

* * * * *

UNITED STATES PATENT AND TRADEMARK OFFICE
CERTIFICATE OF CORRECTION

PATENT NO. : 5,804,114
DATED : October 26, 1998
INVENTOR(S) : Todd Lucas Janes, Johnny Dale Massie, II, Jean Marie Massie, Ronald Lloyd Roe, Donald Wayne Stafford It is certified that error appears in the above-identified patent and that said Letters Patent is hereby corrected as shown below:

| | |
|---|---|
| The front page, Item 75, Inventors | Change "Joan" Marie Massie to read -- Jean Marie Massie. |
| Column 1, Line 27 | Change "sermi-conductive" to read -- semi-conductive --. |
| Column 1, Line 62 | Change "ohm-cmat" to read -- ohm-cm at--. |
| Column 2, Line 45 | Change "ohm-cm ," to read -- ohm-cm,--. |
| Column 4, Line 44 | Change "$rho_o$" to read -- $rho_c$ --. |
| Column 4, Line 47 | Change "rho" to read -- $rho_c$ --. |

Signed and Sealed this

Thirty-first Day of August, 1999

Attest:

Q. TODD DICKINSON

*Attesting Officer*     *Acting Commissioner of Patents and Trademarks*